United States Patent
Salonaho

(10) Patent No.: US 6,480,716 B2
(45) Date of Patent: Nov. 12, 2002

(54) ESTIMATING SUBSCRIBER TERMINAL SPEED, SELECTING CELL, AND RADIO SYSTEM

(75) Inventor: Oscar Salonaho, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/440,680

(22) Filed: Nov. 12, 1999

(65) Prior Publication Data

US 2002/0068581 A1 Jun. 6, 2002

Related U.S. Application Data

(63) Continuation of application No. PCT/FI98/00403, filed on May 12, 1998.

(30) Foreign Application Priority Data

May 13, 1997 (FI) .................................................. 972026

(51) Int. Cl.$^7$ ................................................ H04Q 7/20
(52) U.S. Cl. .................... 455/441; 455/434; 455/522; 455/444; 455/437; 455/436; 455/423; 370/331; 370/337; 370/468
(58) Field of Search ................................ 455/434, 437, 455/441, 444, 522, 456, 436; 370/468, 337

(56) References Cited

U.S. PATENT DOCUMENTS

| | | |
|---|---|---|
| 5,239,667 A | 8/1993 | Kanai |
| 5,392,453 A * | 2/1995 | Gudmundson et al. ..... 455/33.2 |
| 5,585,805 A | 12/1996 | Takenaka et al. |
| 5,604,806 A * | 2/1997 | Hassan et al. ................. 380/44 |
| 5,913,168 A * | 6/1999 | Moreau et al. ............. 455/441 |
| 6,108,532 A * | 8/2000 | Matsuda et al. ............ 455/413 |

FOREIGN PATENT DOCUMENTS

| | | |
|---|---|---|
| DE | 19624113 | 12/1996 |
| EP | 0526436 | 2/1993 |
| GB | 2309843 | 8/1997 |
| WO | 9201950 | 2/1992 |
| WO | 9700587 | 1/1997 |
| WO | 9816079 | 4/1998 |

* cited by examiner

*Primary Examiner*—William Trost
*Assistant Examiner*—Marceau Milord
(74) *Attorney, Agent, or Firm*—Altera Law Group, LLC

(57) ABSTRACT

The invention relates to a method for determining a speed of a subscriber terminal and for selecting a cell in a radio system comprising a plural number of microcells and at least one umbrella cell covering the microcells. The method, and a radio system applying the method, comprise means (32 and 33) which use powers of received signals for producing a probability representing an interdependence between at least two powers measured at different points of time. The probability is used for determining the speed of the subscriber terminal in means (34). In addition, on the basis of the speed of the subscriber terminal, either a microcell or an umbrella cell is selected as a cell for the active operation of the subscriber terminal.

34 Claims, 3 Drawing Sheets

ESTIMATING SUBSCRIBER TERMINAL SPEED, SELECTING CELL, AND RADIO SYSTEM

This is a continuation of PCT/FI98/00403, filed May 12, 1998.

FIELD OF THE INVENTION

The invention relates to a method for estimating a movement of a subscriber terminal in a radio system comprising at least one base station and a subscriber terminal, at least one of which repeatedly measures and stores at different points of time a power of a received signal, the transmission power of the signal being substantially constant or known.

The invention also relates to a method for selecting a cell in a radio system comprising a plural number of microcells and at least one umbrella cell covering the microcells; the radio system comprising at least one base station and a subscriber terminal, which functions actively either in a microcell or an umbrella cell; and at least one base station or subscriber terminal repeatedly measuring and storing at different points of time a power of a received signal, the transmission power of the signal being substantially constant or known.

The invention further relates to a radio system comprising at least one base station and a subscriber terminal, at least one of which is arranged to repeatedly measure and store at different points of time a power of a received signal, the transmission power of the signal being substantially constant or known.

The invention also relates to a radio system comprising at least one base station and a subscriber terminal, which is arranged to function actively either in a microcell or an umbrella cell; at least one base station or subscriber terminal being arranged to repeatedly measure and store at different points of time a power of a received signal, the transmission power of the signal being substantially constant or known.

BACKGROUND OF THE INVENTION

Various different methods have been developed for estimating the speed of subscriber terminals in a mobile system. Speed can be estimated on the basis of power measurements carried out, for instance, by observing quadratic changes in the power level of a received signal. With a suitable measurement period, the average of the changes correlates with the speed of the subscriber terminal. Such prior art solutions are typically based on the idea that an increase in speed causes increasingly bigger changes in the power level.

The measurement of speed can be applied for instance in a radio system in which one and the same area is covered both by a microcell network and a single large umbrella cell. In this case it is advantageous that high-speed subscriber terminals make a connection to an umbrella cell and low-speed subscriber terminals to a microcell network, otherwise the number of base station alternatives and disconnected calls increases.

A typical problem with prior art solutions is that since there is no clear interdependency between the extent of variations in power level and the speed of the subscriber terminal, particularly in a strongly varying environment, the determination of speed is unsuccessful. When speed cannot be determined, connection to a microcell or an umbrella cell cannot be optimally made either.

SUMMARY OF THE INVENTION

An object of the present invention is thus to provide a method and a radio system determining a speed of a subscriber terminal on the basis of variations in the power level of a received signal, without taking the extent of the variations into account. In addition, the making of a connection to microcells and umbrella cells by subscriber terminals is optimized on the basis of their speed.

This is achieved with a method described in the preamble, characterized in that measured powers of signals are used for producing a probability representing an interdependence between powers measured at least at two different points of time, the probability being used for estimating a movement of a subscriber terminal.

A method of the invention for selecting a cell in a radio system is characterized by using measured powers of signals for producing a probability representing an interdependence between powers measured at least at two different points of time, the probability being used for estimating a movement of a subscriber terminal; and selecting, on the basis of the estimated movement of the subscriber terminal, either a microcell or an umbrella cell as a cell for the active operation of the subscriber terminal.

A radio system of the invention is characterized in that the radio system is arranged to use measured powers of signals for producing a probability representing an interdependence between powers measured at least at two different points of time, the radio system being arranged to use the probability for estimating a movement of a subscriber terminal.

A radio system of the invention is also characterized in that the radio system is arranged to use measured signal powers for producing a probability representing an interdependence between powers measured at least at two different points of time, said probability estimating a movement of a subscriber terminal; the radio system being arranged to select, on the basis of the estimated movement of the subscriber terminal, either a microcell or an umbrella cell as a cell for the active operation of the subscriber terminal.

The invention provides considerable advantages. Subscriber terminal speed measured on the basis of a probability relating to a power level of a received signal allows speed to be more reliably determined, particularly in a varying environment. Also the location of a subscriber terminal in a cell hierarchy can be optimized and handover algorithms clarified.

DESCRIPTION OF THE DRAWINGS

In the following the invention will be described in greater detail with reference to examples in the attached drawings, in which.

DESCRIPTION OF PREFERRED EMBODIMENTS

Figure 1:
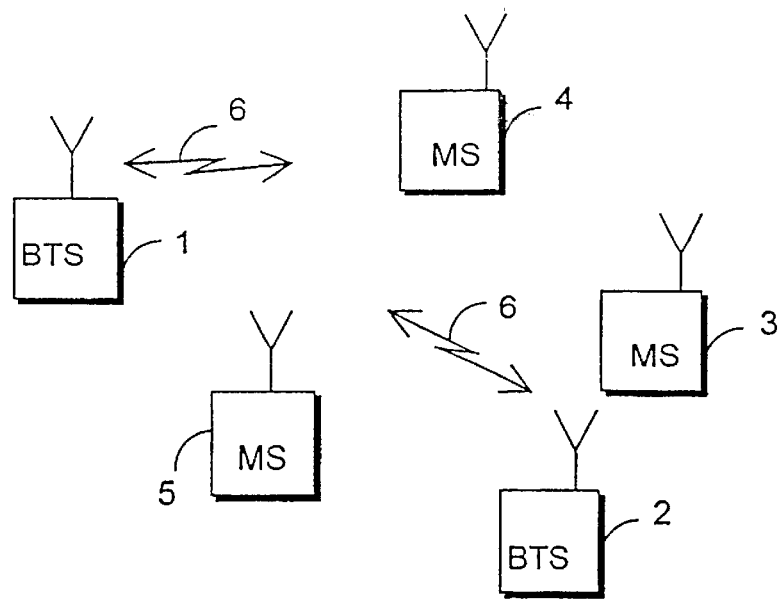
FIG. 1 illustrates a cellular radio system.

A solution of the invention can be applied in cellular radio systems such as the GSM (Global System for Mobile Communications), the DCS-1800 (Digital Cellular System) and the CDMA (Code Division Multiple Access).

Let us now study a method of the invention in greater detail. The invention is based on the fact that a signal power received in a radio system is dependent on locality. The faster a subscriber terminal, i.e. a mobile station in a radio system, moves, the less probable it is that the power of a received signal will remain unchanged from one point of time to another.

In the inventive method, a statistical estimator based on a probability of a power level behaviour is produced for estimating a movement of a subscriber terminal. A subscriber terminal or a base station repeatedly measures and stores at different points of time a received signal power, the transmission power of the signal being constant or known. An example of such a signal is a pilot signal. From the measurement data is generated, by means of the measured powers, a probability representing an interdependence between powers measured at least at two different points of time, the probability being used for estimating the movement of the subscriber terminal. Movement here refers to a momentary speed, the direction of which is not defined, of a subscriber terminal. In other words, instead of the speed of a subscriber terminal being concluded from the extent of variation in power, the inventive method uses a probability of variation in or invariability of a power level for estimating the speed. Since the only focus of interest in the inventive method is the probability of variation in or invariability of a signal power, or the like, it is not necessary that the transmission power of a received signal is known. Instead, it is sufficient that the transmission power of the signal remains unchanged or changes slowly in relation to the probabilities to be produced.

In a second embodiment of the invention, which relates to a radio system comprising microcells and umbrella cells, a speed of a subscriber terminal is estimated and, in addition, on the basis of the estimated speed of the subscriber terminal, either a microcell or an umbrella cell is selected as a cell for the active operation of the subscriber terminal. A cell for the active operation here refers to a cell or, more precisely, to a base station, to which the subscriber terminal is connected, within a cell. If the estimated movement of the subscriber terminal is faster than a predetermined threshold value, the cell selected for the active operation of the subscriber terminal is an umbrella cell. If, on the other hand, the estimated movement of the subscriber terminal is slower than a predetermined threshold value, the cell selected for the active operation of the subscriber terminal is a microcell. A base station of an umbrella cell is thus only connected to high-speed subscriber terminals. At the same time, handovers of subscriber terminals can be optimized, because a high-speed subscriber terminal making a connection to a microcell would cause a large number of channel/base station handovers, which would also increase the risk of a call being disconnected. The predetermined threshold value for speed is radio-system-specific and umbrella-cell-specific and it can be determined for instance by the operator.

The solution of the invention proceeds as follows. Signal powers are measured during a predetermined period of measurement. From the measurement period is then produced a moving average of the signal power and the values of the measured powers of received signals are normalized by the moving average. A normalized signal is advantageously processed as a Markov chain, in which a current state is only dependent on the immediately preceding status. Normalization, in turn, is advantageously performed by subtracting the moving average from each measurement result obtained during said measurement period and used in processing. Normalization is not, however, a necessary operation for the invention. To further enhance the inventive solution, the range between a highest and a lowest measured power in a desired period of measurement is divided into a predetermined number of power classes. The measurement period is advantageously of the order from 0.2 s. to 10 s., and the number of power classes is advantageously of the order from 2 to 20. Each measured power is approximated to a power class of a suitable order and at least one probability is produced, the probability representing an interdependence between at least two power classes of different points of time. On the basis of at least one produced probability it is then possible to estimate the speed of a subscriber terminal.

Instead of a single probability, estimation can be made using a probability distribution comprising a plural number of probabilities. Such a group of probabilities represents a probability distribution relating to a variation in measured powers between two successive points of time and the probability distribution can be used similarly as a single probability for estimating the speed of a mobile terminal.

In the inventive method normalization is not necessarily needed if a mode of the probability distribution, i.e. the most expected value, is used for estimating a movement of a subscriber terminal. This means that the speed of the subscriber terminal is determined according to the most common, i.e. the most probable, variation in power.

A probability can describe either the probability of variation in or invariability of power. In the inventive method it is possible to produce advantageously at least one probability of a received power remaining substantially unchanged at least at two successive points of time, said at least one probability being used for estimating the speed of a subscriber terminal. Also in this case a probability distribution can be made use of. The smaller the probability of invariability of power, the higher the speed of the subscriber terminal is estimated to be.

When a probability represents the probability of variation in power, at least one probability of a received power changing at least at two successive points of time is produced in the inventive method, said at least one probability being used for estimating the speed of a subscriber terminal. Also in this case a probability distribution can be made use of. The smaller the probability of variation in power, the lower the speed of the subscriber terminal is estimated to be.

The probability estimating the speed of a subscriber terminal is matched to a predetermined statistical model to provide a more accurate estimation of speed. The predetermined statistical model is preferably based on measurements made within the area of the radio system and it is typically a cell-specific model. In the inventive method is thus determined a probability p of a suitably classified material based on measurements remaining unchanged at two or more different points of time. It is also possible to determine a probability 1—p of the suitably classified material changing from one point of time to another.

On the basis of an estimated speed of a subscriber terminal, an active group of the subscriber terminal is updated. In a prior art radio system, a pilot signal is used in a known manner in connection with base station identification and, in a CDMA system in particular, in connection with the building of the active group. A pilot signal is a spread-coded signal, without data modulation, that each base station continuously broadcasts to its coverage area. A subscriber terminal can identify base stations from the pilot signal because the spreading codes of pilot signals differ from one another. Subscriber terminals continuously measure pilot signals. To reduce the measurement load, each subscriber terminal of a prior art system keeps a measurement list of base stations and the corresponding spreading codes of pilot signals that are located close to the subscriber terminal concerned and that are potential candidates for a handover or a connection set-up. The base stations in the measurement list build up a group of candidates which can become members of the active group. Connections from a fixed network to an active group can be quickly set up. Subscriber terminals observe at highest priority only pilot signals of base stations included in the measurement list. As a subscriber terminal moves, the measurement list must naturally be updated as needed. In prior art systems, the subscriber terminal performs the updating on the basis of a measurement of a pilot signal strength. In other words, if a pilot sent by a base station is received at a sufficient strength, it is added to the measurement list.

The measurement results can be mathematically processed in the form of a matrix, whereby a measurement period is used for estimating a signal transition probability matrix between said power classes. The matrix describes a probability of each power class remaining unchanged (or, alternatively, changes it) in two different measurement periods. The elements of a diagonal in the matrix thus produced can be used for generating various different estimators (for instance a sum of the elements of the diagonal) for a subscriber terminal speed. The principle, however, is that the faster the subscriber terminal moves, the smaller the elements in the diagonal are, when the probability represents invariability of the powers. The values of the elements of the diagonal can also be weighted by a probability of appearance of each class, whereby a sum of the diagonal provides a probability of a signal remaining in one and the same class from a moment T(n) to a next moment T(n+1), in which n is an index of the points of time and belongs to whole numbers.

Let us now study a radio system of the invention in greater detail. FIG. 1 shows a typical radio system comprising cells, each of which has a base station and typically a number of subscriber terminals that are preferably mobile phones. Both base stations 1 and 2 and subscriber terminals 3 to 5 comprise at least one transceiver, which the subscriber terminals 3 to 5 and the base stations 1 and 2 use for sending signals 6 to each other.

Figure 2:
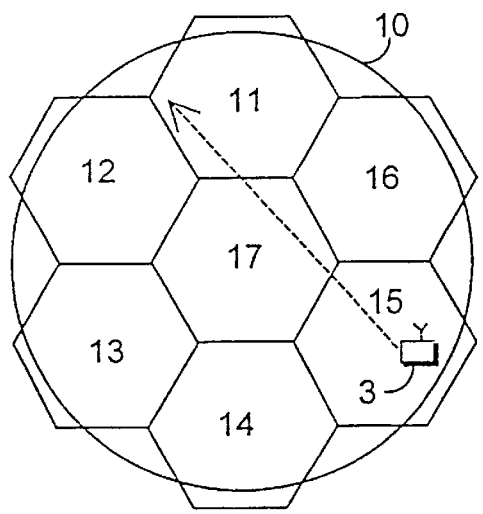
FIG. 2 illustrates an umbrella cell comprising a plural number of microcells.

FIG. 2 shows a radio system comprising an umbrella cell 10 and microcells 11 to 17 located substantially within the umbrella cell 10. A subscriber terminal 3 moves within the coverage area of the umbrella cell 10. If the speed of the subscriber terminal 3 is higher than a predetermined threshold value, the subscriber terminal 3 makes a connection to the umbrella cell 10. On the other hand, if the subscriber terminal 3 is stationary or its speed is lower than the predetermined threshold value, the subscriber terminal 3 shown in FIG. 2 makes a connection to a microcell 15. As the subscriber terminal 3 slowly moves out of the cell 15 towards for instance a cell 17, it performs a prior art handover to the cell 17.

Figure 3:
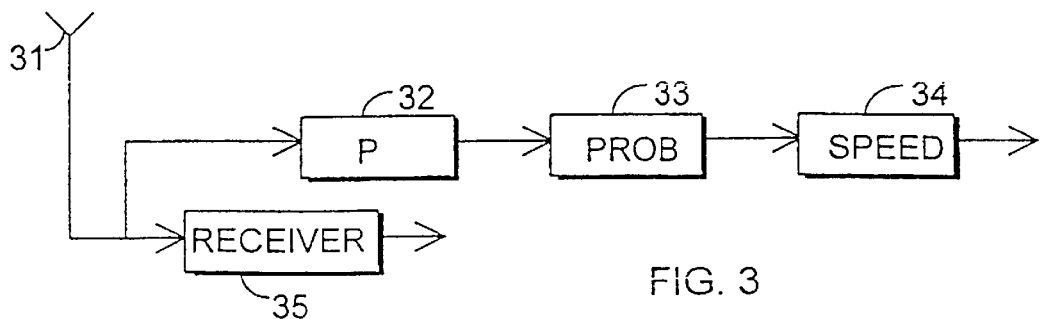
FIG. 3 illustrates a block diagram of a receiver.

FIG. 3 is a block diagram illustrating the subscriber terminal 3. The subscriber terminal comprises an antenna 31, means 32 for measuring power and means 33 for producing a probability, means 34 for determining speed. A means 35 represents a prior art receiver which is, as such, not essential to the invention. The means 32 measure a received signal power arriving from the antenna 31. The means 33 produce, according to the inventive method, one or more probabilities or probability distributions between two or more points of time. The means 34 use said one or more probabilities or probability distributions for producing a speed estimate for the subscriber terminal, said speed estimate being preferably sent over a radio path to other parts of the radio system and controlling both the location of the subscriber terminal in the cell hierarchy and its handover.

A subscriber terminal of the inventive solution advantageously signals one or more probabilities or probability distributions it has produced to a base station. The radio system involved comprises a neuronetwork, or the like, located at a base station or a base station controller or other part of the radio system to which the base station is connected. Also a common adaptive non-linear filter can function as a neuronetwork. In addition to, or instead of, the probability or the distribution, the subscriber terminal can also send coefficients generated from the probability or the distribution, the coefficients being advantageously used in a known manner as weighting coefficients of the neuronetwork.

When a neuronetwork is used in a subscriber terminal for estimating the movement of the subscriber terminal, the base station advantageously sends to the subscriber terminal the neuronetwork coefficients for the determining of speed. The base station can also send to the subscriber terminal a formula on the basis of which the speed of the subscriber terminal is estimated from the probability distribution.

Irrespective of the direction to which signalling is performed, the inventive method enables signalling to be used for sending probabilities or probability distribution elements, such as an average value and a standard deviation, concerning one or more power-classes.

Figure 4:
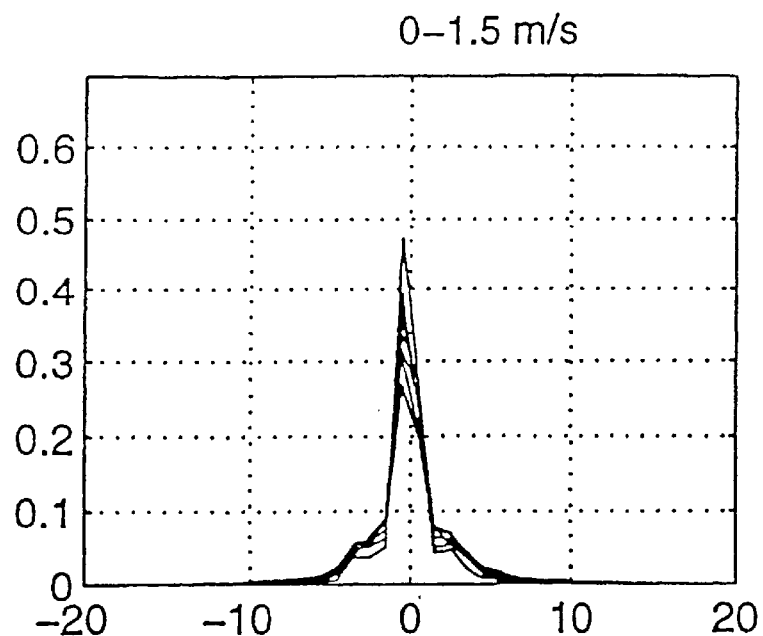
FIG. 4 illustrates a distribution of power variations.
Figure 5:
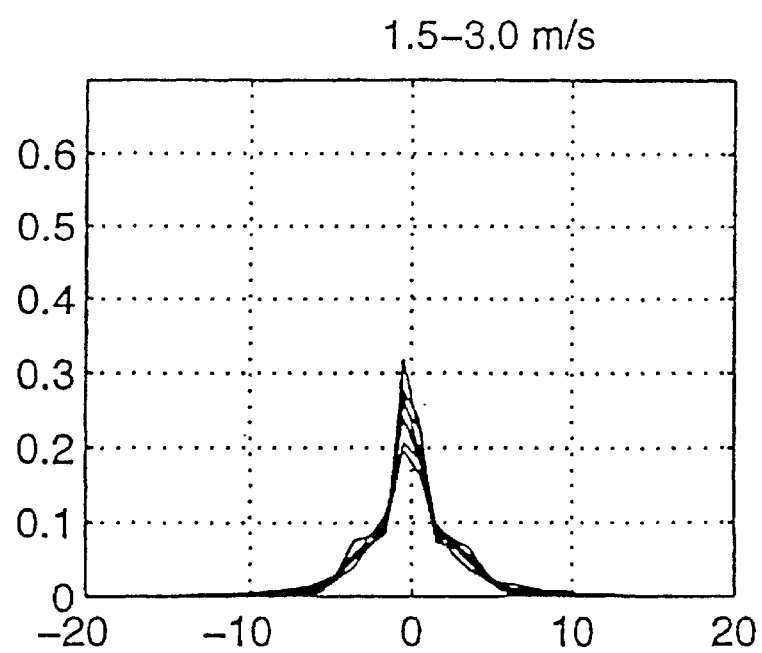
FIG. 5 illustrates a distribution of power variations.
Figure 6:
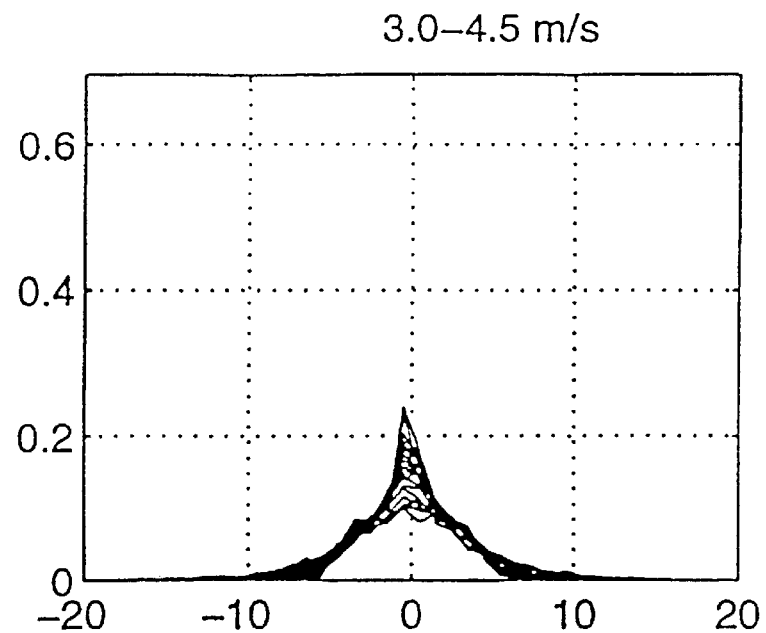
FIG. 6 illustrates a distribution of power variations.
Figure 7:
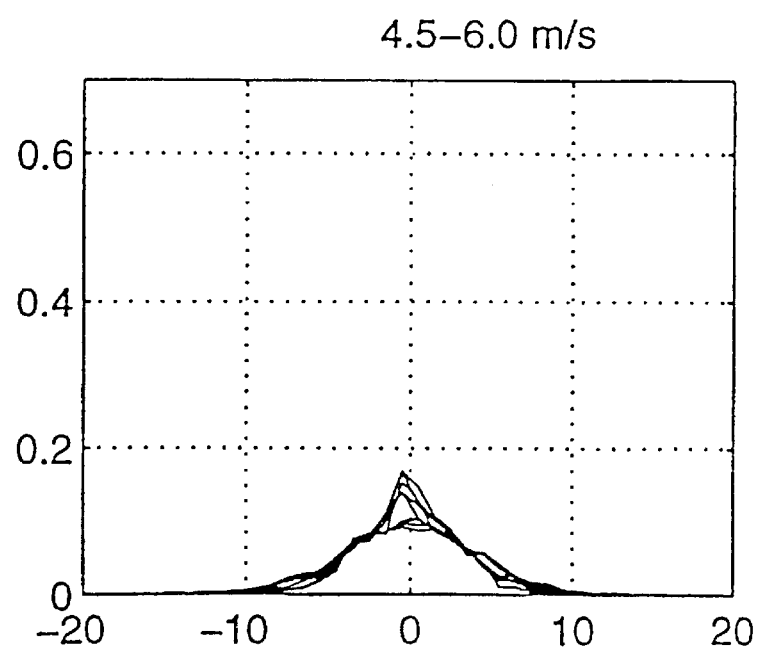
FIG. 7 illustrates a distribution of power variations.

Figures from 4 to 7 illustrate distributions of power variations in different classes of speed. In Figures from 4 to 7, the probability represents the invariability, from one point of time to another, of the power class of a received signal. In FIG. 4 the subscriber terminal has moved at a speed from 0 to 1.5 m/s. In this case the probability distribution is narrow and it centres about zero, i.e. the probability of variation in power level is small. In FIG. 5 the subscriber terminal has moved at a speed from 1.5 to 3.0 m/s. The probability distribution in this case is slightly broader. As the speed grows further, reaching 3.0 to 4.5 m/s, also the probability distribution in FIG. 6 becomes broader and the maximum value of the probability has decreased from the value 0.47 in FIG. 4 to the value 0.24. With the speed between 4.5 to 6.0 m/s, the maximum value of the probability has decreased below 0.2 and the distribution is significantly broader. In Figures from 4 to 7 signal power has remained invariable. Signal power can, however, increase or decrease steadily. A reason for the variation in power can be a change in transmission power or a change in the distance between a subscriber terminal and a base station. If the power level of a received signal increases or decreases during the time of measurement of the power levels, the distribution moves horizontally in the co-ordinate system, which is shown particularly in a shift of the distribution peak. A distribution mode can then be advantageously used to determine a movement of the subscriber terminal.

Although the invention is described above with reference to an example shown in the attached drawings, it is apparent that the invention is not restricted to it, but can be varied in many ways within the inventive idea disclosed in the attached claims.

What is claimed is:

1. A method for estimating a movement of a subscriber terminal in a radio system comprising:

repeatedly measuring and storing at, at least one base station or a subscriber terminal at different points in time, a power of a received signal, the transmission power of the received signal being substantially constant or known, wherein measured powers of the received signal are used for producing a probability representing an interdependence between powers measured at least at two different points of time, the probability being used for estimating a movement of a subscriber terminal.

2. A method for selecting a cell in a radio system comprising a plural number of microcells and at least one umbrella cell covering the microcells; the radio system comprising:

actively operating at least one base station and a subscriber terminal either in a microcell or in the umbrella cell; and repeatedly measuring and storing at, at least one base station or subscriber terminal at different points in time, a power of a received signal, the transmission power of the signal being substantially constant or known, wherein using the measured powers of the received signal for producing a probability representing an interdependence between powers measured at least at two different points of time, the probability being used for estimating a movement of a subscriber terminal, and selecting, on the basis of the estimated movement of the subscriber terminal, either a microcell or an umbrella cell as a cell for the active operation of the subscriber terminal.

3. The method according to claim 2, wherein if the estimated movement of the subscriber terminal is faster than a predetermined threshold value, the cell selected for the active operation of the subscriber terminal is an umbrella cell and if the estimated movement of the subscriber terminal is slower than a predetermined threshold value, the cell selected for the active operation of the subscriber terminal is a microcell.

4. A method according to claim 1, wherein performing the measurements during a predetermined period of measurement, further comprises, producing from the period of measurement a moving average of the power of a signal, normalizing the values of the measured powers of received signals by the moving average of the power of the signal, and using the normalized powers for producing a probability.

5. The method according to claim 4, wherein a normalization is performed by subtracting the moving average from the measurement results of said measurement period.

6. The method according to claim 1, further comprises dividing a range between a highest and a lowest power into a predetermined number of power classes, to which the measured powers are approximated, producing at least one probability representing an interdependence between at least two power classes of different points of time, and estimating, on the basis of said at least one probability, the movement of the subscriber terminal.

7. The method according to claim 1, wherein producing a group of probabilities representing a probability distribution of variation in powers between two successive points of time, and using the probability distribution for estimating the movement of the subscriber terminal.

8. The method according to claim 1, wherein producing at least one probability of a received power remaining substantially unchanged at least at two successive points of time and using said at least one probability for estimating the movement of the subscriber terminal.

9. The method according to claim 8, wherein the smaller the probability, the faster the movement of the subscriber terminal is estimated to be.

10. The method according to claim 1, further comprises producing at least one probability of a received power changing at least at two successive points in time, and using said at least one probability for estimating the movement of the subscriber terminal.

11. The method according to claim 10, wherein the smaller the probability, the slower the movement of the subscriber terminal is estimated to be.

12. The method according to claim 1, wherein the probability estimating the movement is matched to a predetermined statistical model to provide a more accurate estimation of the movement of the subscriber terminal.

13. The method according to claim 1, wherein the estimated movement of the subscriber terminal is used for updating an active group of the subscriber terminal.

14. The method according to claim 1, wherein the subscriber terminal transmits the probability the subscriber terminal has produced to the base station for the movement of the subscriber terminal to be estimated.

15. The method according to claim 1, wherein the base station transmits the probability the base station has produced to the subscriber terminal for the movement of the subscriber terminal to be estimated.

16. The method according to claim 1, wherein the movement of the subscriber terminal is estimated using a neuronetwork.

17. The radio system comprising:

at least one base station and a subscriber terminal, at least one of which is arranged to repeatedly measure and store at different points of time a power of a received signal, the transmission power of the signal being substantially constant or known, wherein the radio system is arranged to use the measured powers of signals for producing a probability representing an interdependence between powers measured at least at two different points in time, the radio system being arranged to use the probability for estimating a movement of a subscriber terminal.

18. The radio system comprising:

at least one base station and a subscriber terminal, which is arranged to function actively either in a microcell or an umbrella cell; at least one base station or subscriber terminal being arranged to repeatedly measure and store at different points of time a power of a received signal, the transmission power of the signal being substantially constant or known, wherein the radio system is arranged to use the measured powers of signals to produce a probability representing an interdependence between powers measured at least at two different points of time, the probability estimating a movement of a subscriber terminal, and the radio system is arranged to select, on the basis of the estimated movement of the subscriber terminal, either a microcell or an umbrella cell as a cell for the active operation of the subscriber terminal.

19. The radio system according to claim 18, wherein if the movement of the subscriber terminal is estimated to be faster than the movement indicated by a predetermined threshold value, the radio system is arranged to select an umbrella cell as the cell for the active operation of the subscriber terminal and if the movement of the subscriber terminal is estimated to be slower than the movement indicated by a predetermined threshold value, the radio system is arranged to select a microcell as the cell for the active operation of the subscriber terminal.

20. The radio system according to claim 17, wherein the radio system is arranged to perform the measurements at a predetermined period of measurement and to normalize the values of the powers of a received signal by a moving average of a power of the signal.

21. The radio system according to claim 20, wherein the radio system is arranged to normalize the values of the powers by subtracting the moving average from the measurement results of the measurement period.

22. The radio system according to claim 17, wherein the radio system is arranged to divide a range between a highest and a lowest power into a predetermined number of power classes, to which the radio system is arranged to approximate the measured values, and the radio system is arranged to produce at least one probability representing an interdependence between at least two power classes of different points of time and the radio system is arranged to estimate on the basis of said at least one probability the movement of the subscriber terminal.

23. The radio system according to claim 17, wherein when the produced probabilities represent a probability distribution of variation in the measured powers, the radio system is arranged to estimate the movement of the subscriber terminal between two successive points of time by using the probability distribution.

24. The radio system according to claim 17, wherein the radio system is arranged to produce a probability of a received power remaining substantially unchanged at least at two successive points of time, and to use said probability for estimating the movement of the subscriber terminal.

25. The radio system according to claim 24, wherein the radio system is arranged so that the smaller the probability, the faster the system estimates the movement of the subscriber terminal to be.

26. The radio system according to claim 17, wherein the radio system is arranged to produce at least one probability of a received power changing at least at two successive points of time, and to use said at least one probability for estimating the movement of the subscriber terminal.

27. The radio system according to claim 26, wherein the radio system is arranged so that the smaller the probability, the slower the system estimates the movement of the subscriber terminal to be.

28. The radio system according to claim 17, wherein producing at least one probability of the power of a received signal changing at least at two successive points of time and using said at least one probability for estimating the movement of the subscriber terminal.

29. The radio system according to claim 28, wherein the smaller the probability, the slower the movement of the subscriber terminal is estimated to be.

30. The radio system according to claim 17, wherein the radio system is arranged to match the probability estimating the movement to a predetermined statistical model for a more accurate estimation of the movement of the subscriber terminal.

31. The radio system according to claim 17, wherein on the basis of the estimated movement of the subscriber terminal, the radio system is arranged to update an active group of the subscriber terminal.

32. The radio system according to claim 17, wherein the subscriber terminal is arranged to transmit the probability the subscriber terminal has produced to the base station for the movement of the subscriber terminal to be estimated.

33. The radio system according to claim 17, wherein the base station is arranged to transmit the probability the base station has produced to the subscriber terminal for the movement of the subscriber terminal to be estimated.

34. The radio system according to claim 17, wherein the radio system further comprises a neuronetwork which is used for estimating the movement the subscriber terminal.

* * * * *